United States Patent [19]

Crawford

[11] Patent Number: 5,116,066
[45] Date of Patent: May 26, 1992

[54] MECHANICAL SEAL CONSTRUCTION AND LOCKING ASSEMBLY FOR USE THEREIN

[75] Inventor: Sandy L. Crawford, Katy, Tex.

[73] Assignee: Utex Industries, Inc., Houston, Tex.

[21] Appl. No.: 777,481

[22] Filed: Oct. 15, 1991

Related U.S. Application Data

[63] Continuation of Ser. No. 499,780, Mar. 27, 1990, abandoned.

[51] Int. Cl.⁵ .............................................. F16J 15/16
[52] U.S. Cl. .................................. 277/81 R; 277/86; 277/136
[58] Field of Search ................... 277/81 R, 81 P, 136, 277/137, 86, 87, 91, 92, 93 R, 94

[56] References Cited

U.S. PATENT DOCUMENTS

| | | | |
|---|---|---|---|
| 2,393,944 | 1/1946 | Walley, Jr. | 277/86 |
| 2,667,388 | 1/1954 | Schick | 277/86 |
| 2,685,464 | 8/1954 | Murphy | |
| 3,116,066 | 12/1963 | Koppius | 277/81 |
| 3,339,930 | 9/1967 | Tracy | 277/93 R |
| 3,836,157 | 9/1974 | Hummer | |
| 4,842,494 | 6/1989 | Spelser | 277/81 R |

OTHER PUBLICATIONS

Burgmann Design Manual 13/3, published 1988, four pages.

*Primary Examiner*—William A. Cuchlinski, Jr.
*Assistant Examiner*—Daniel G. DePumpo
*Attorney, Agent, or Firm*—Browning, Bushman, Anderson & Brookhart

[57] ABSTRACT

A mechanical seal construction for use between a wall and a shaft extending through the wall and rotatable relative thereto, the seal construction comprising a seal assembly which includes a pair of seal elements having mutually engaging sealing faces, one seal element being fixed with respect to the wall and the other seal element being rotatable in response to rotation of the shaft, the seal assembly having an inner annular member operatively engaged with the stationary seal element and having a radially outwardly facing surface, at least three, generally equally spaced hemispherical recesses being formed in the surface, a fixed outer annular member in surrounding relationshp to the inner annular member, the outer annular member having at least three equally spaced, axially extending grooves, each of the receses having received therein a ball having a radius substantially equal to the radius of the recess, each of the balls projecting into a respective one of the grooves to prevent relative rotation between the inner and outer annular members, an annular space being formed between portions of the inner and outer annular members, the inner annular member being axially movable with respect to the outer annular member and a single convolution spring, such as a wave spring washer, disposed in the annular space to urge the inner annualr member toward the stationary seal element whereby the sealing faces on the stationary seal element and the rotating seal element are maintained in sealing contact.

8 Claims, 3 Drawing Sheets

MECHANICAL SEAL CONSTRUCTION AND LOCKING ASSEMBLY FOR USE THEREIN

This is a continuation of co-pending U.S. application Ser. No. 07/499,780 filed on Mar. 27, 1990 now abandoned.

BACKGROUND OF THE INVENTION

1. Field of the Invention

The present invention relates to an end face, pusher-type mechanical seal construction and, more particularly, to a mechanical seal construction having an improved structure for effecting and maintaining positioning or locking of the stationary seal element in the construction.

2. Description of the Background

Numerous different mechanical seals have been proposed to effect sealing around a shaft to prevent leakage of both sealing fluid and operating fluid from an enclosure. Typical of such mechanical seal assemblies are shown in U.S. Pat. Nos. 3,836,157 and 2,685,464.

The above-mentioned patents describe various means of keying the rotating shaft and the rotating seal element together (U.S. Pat. No. 3,836,157) or keying the stationary seal element to the seal gland or other fixed structure in which the seal assembly is mounted (U.S. Pat. No. 2,685,464).

There are several inherent problems associated with mechanical seal assemblies. For one, most are relatively complicated in design having a large number of parts resulting in a size which generally precludes their installation in confined spaces. For example, in pusher-type mechanical seals, springs are used as energizers, generally to urge the stationary seal element into sealing engagement with the rotating seal element. These springs are in the form of compression coil springs, as shown in the aforementioned patents. When coil springs are employed as energizers, there may be a single coil spring which is disposed in generally surrounding relationship to the shaft which is being sealed, such as shown in U.S. Pat. No. 2,685,464. Alternatively, a plurality of spaced coil springs can be disposed at circumferentially spaced locations around the shaft. Whatever the arrangement, the use of coil springs poses problems in obtaining uniform loading. Wave and Belleville springs have also been used in mechanical seal assemblies.

It is common, as shown in U.S. Pat. No. 2,685,464, to key or position the stationary seal element to the gland or other fixed seal structure by means of balls which are disposed in registering grooves in the carrier for the stationary seal and in the gland or other fixed portion of the seal assembly. As shown in U.S. Pat. No. 2,685,464, three of such key or locking assemblies can be employed at generally equally spaced circumferential positions around the shaft to maintain concentricity. The balls in engagement with the registering grooves permit relative axial movement of the stationary seal with respect to the gland or other fixed seal element and thereby allow the spring to maintain a pressure against the stationary seal urging it into sealing engagement with the rotating seal element. However, the use of elongate grooves forming an elongate keyway in which the balls ride permits the balls to move to different relative axial locations possibly causing the loss of concentricity within the seal structure and binding between the seal elements.

U.S. Pat. No. 3,836,157 discloses keying the rotating seal element to the rotating shaft by means of a key assembly comprising a hemispherical recess in which is received a ball having a radius substantially the same as that of the recess, the ball also being received in an elongate groove in a collar disposed in surrounding relationship to the shaft and rotatable therewith. In the assembly shown in U.S. Pat. No. 3,836,157, a single ball is employed, the ball being used primarily as a drive connection between the shaft sleeve and the collar to impart rotatable motion to the rotating seal elements.

SUMMARY OF THE INVENTION

It is therefore an object of the present invention to provide an improved mechanical seal construction of the end face type.

Another object of the present invention is to provide an improved mechanical seal construction wherein concentricity of the stationary seal element is assured while permitting relative axial movement between the stationary seal element and a gland or other fixed seal portion to which the stationary seal is keyed.

Yet another object of the present invention is to provide a mechanical seal construction which eliminates the use of coil-type compression springs providing a more compact and simplified structure.

A further object of the present invention is to provide a locking apparatus for locking first and second members together to prevent relative rotation between the members while permitting relative axial movement.

The above and other objects of the present invention will become apparent from the drawings, the description given herein and the appended claims.

The present invention is an improvement in a mechanical seal construction for use typically between a wall and a shaft which extends through the wall and which is rotatable relative thereto. In such seal constructions, there is a seal assembly which includes a pair of seal elements having mutually engaging sealing faces, one of the seal elements being fixed with respect to the wall and the other seal element being rotatable in response to rotation of the shaft. The improved mechanical seal construction of the present invention includes an inner annular member which is operatively engaged with or supports the stationary seal element and which, like the stationary seal element, is fixed with respect to the wall. The inner annular member includes at least three, generally equally, circumferentially spaced hemispherical recesses which are formed on a radially outwardly facing surface. A fixed outer annular member is disposed in generally surrounding relationship to the inner annular member, the outer annular member having at least three generally equally, circumferentially spaced, axially extending grooves, the groove being in register with the recesses. Each of the recesses has received therein a ball which has a radius substantially equal to the radius of the recess, each one of the balls projecting into a respective one of the grooves. An annular space is formed between portions of the inner and outer annular members, the inner annular member being axially movable but non-rotatable with respect to the outer annular member. A single convolution spring member is disposed in the annular space to urge the inner annular member toward the stationary seal element whereby the sealing faces on the stationary sealing element and the rotating seal element are maintained in sealing contact.

The present invention also provides an improved locking apparatus for locking or keeping two concentrically disposed members together to prevent relative rotation therebetween while permitting relative axial movement. The apparatus includes an inner, annular member, the inner annular member having a radially outwardly facing surface. At least three, generally equally circumferentially spaced hemispherical recesses are formed in the surface. An outer annular member is disposed in surrounding relationship to the inner annular member, the outer annular member having at least three, generally equally circumferentially spaced, axially extending grooves, respective ones of the grooves being in register with respective ones of the recesses. Each of the recesses has received therein a ball having a radius substantially equal to the radius of the recess, each of the balls projecting into a respective one of the grooves to prevent relative rotation between the inner and outer annular members.

DESCRIPTION OF PREFERRED EMBODIMENTS

Figure 1:
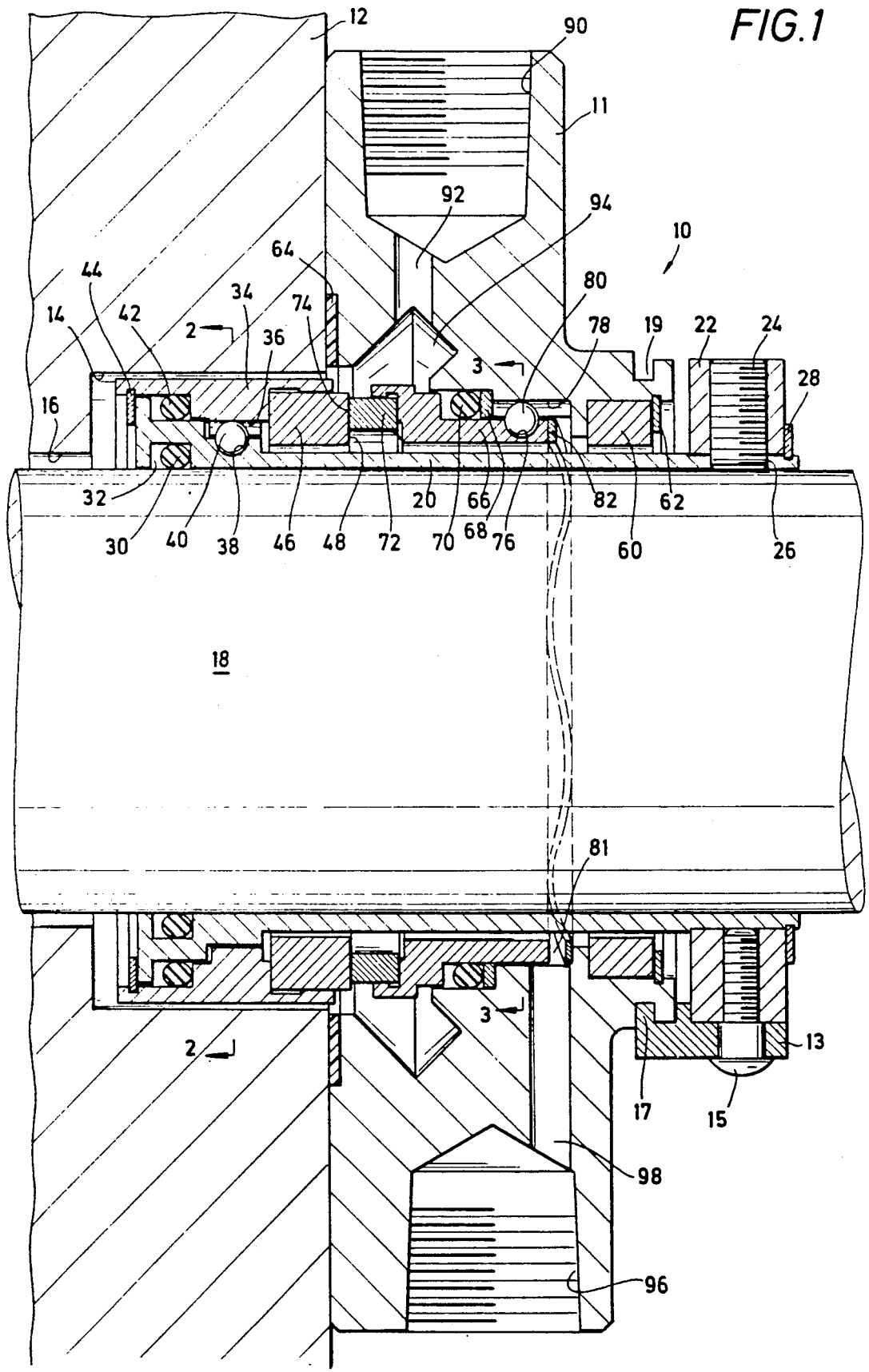
FIG. 1 is a central, longitudinal sectional view taken through a mechanical seal construction in accordance with the present invention.
Figure 2:
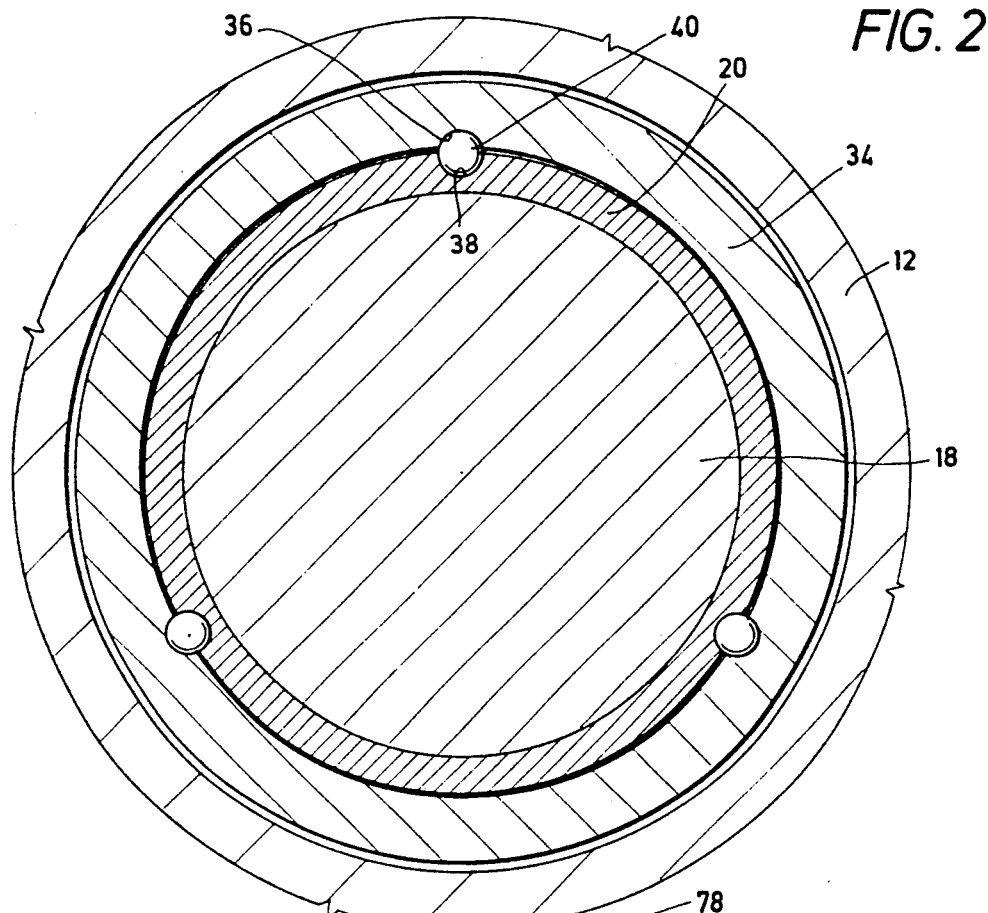
FIG. 2 is a view taken along the lines 2—2 of FIG. 1.
Figure 3:
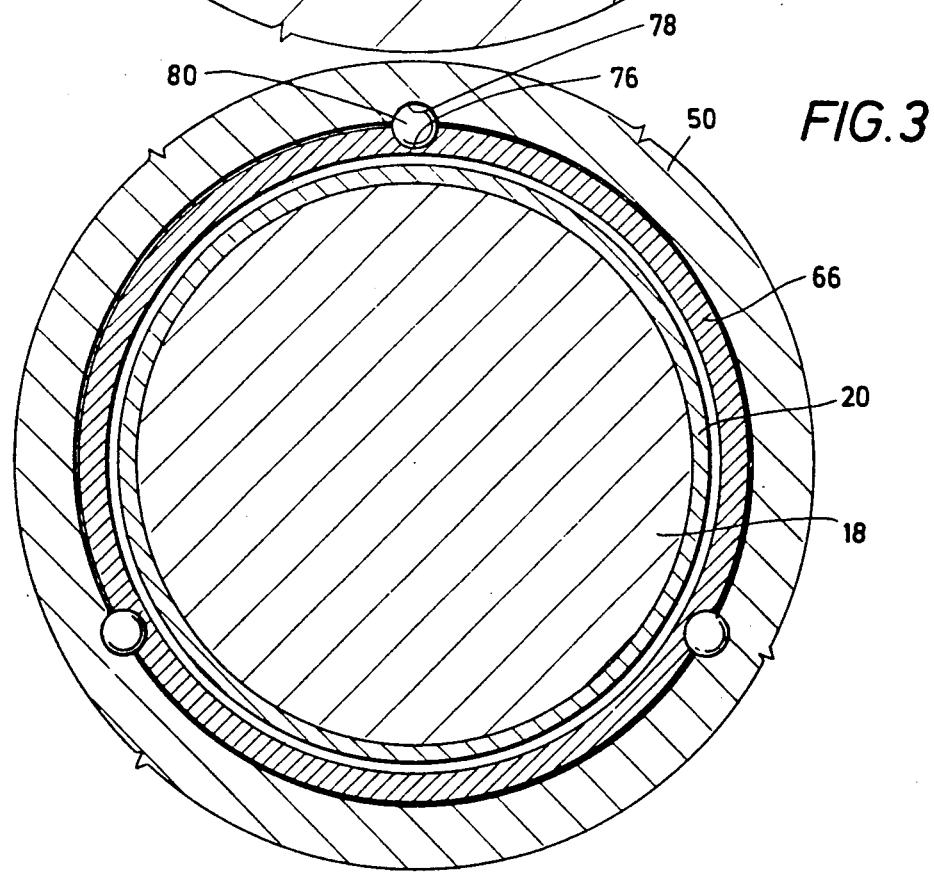
FIG. 3 is a view taken along the lines 3—3 of FIG. 1.

Referring first to FIGS. 1-3, the seal construction, shown generally as 10, is used in conjunction with a pump or the like (not shown) having a housing or body 12 with a cylindrical wall 16 defining a bore through which a shaft 18 extends, shaft 18 being rotatable with respect to wall 16. Body 12 also has a second cylindrical wall 14 defining a bore which is larger in diameter than the bore defined by wall 16, cylindrical wall 14 actually forming a counterbore to the bore formed by cylindrical wall 16, a portion of the seal construction 10 being received in the counterbore defined by cylindrical wall 14. A gland 11 which carries the seal assembly hereafter described is secured to the housing 12 by means not shown, gland 11 and body 12 forming a generally fixed structure. Sealing between gland 11 and body 12 is accomplished by a gasket 64.

Surrounding shaft 18 is a sleeve 20. A drive collar 22 received around sleeve 20 is provided with a set screw 24 which extends through a bore 26 in sleeve 20, set screw 24 engaging shaft 18 securing sleeve 20 to shaft 18 and ensuring rotation of sleeve 20 with rotation of shaft 18. A snap ring 28 prevents axial displacement of drive collar 22 off of sleeve 20. Sealing between sleeve 20 and shaft 18 is accomplished by an O-ring 30 received in an annular groove 32 in sleeve 20 in surrounding relationship to shaft 18. In order to secure sleeve 20 and the associated seal assembly to the gland 11, a holding clip 13 is secured to drive collar 22 by means of a cap screw 15, clip 13 having a dog 17 which is received and rotates in an annular groove 19 in gland 11.

Sleeve 20 is keyed to an annular rotating face body 34 which is in generally surrounding relationship to sleeve 20. For this purpose, body 34 is provided with three circumferentially and generally equally spaced axially extending grooves 36, while sleeve 20 is provided with three circumferentially and equally spaced hemispherical recesses 38, recesses 38 and grooves 36 being in register with one another. Received in each of recesses 38 is a ball 40, the radius of ball 40 and of hemispherical recess 38 being substantially the same. Likewise, as best seen with reference to FIG. 2, grooves 36 have a curved or radiused wall the radius of which is substantially equal to the radius of the ball 40. Recess 38, balls 40 and groove 36 thus form a key assembly such that sleeve 20 is locked to stationary face body 34 whereby rotation of sleeve 20 in response to rotation of shaft 18 results in rotation of rotating face body 34. Sealing between rotating face body 34 and sleeve 20 is accomplished by an O-ring 42. Snap ring 44 received in rotating face body 34 prevents separation of sleeve 20 from rotating face body 34.

Rotating face body 34 carries a rotating face insert 46 which forms a rotating seal element having a generally axially disposed seal face 48. It will thus be seen that as shaft 18 rotates, sleeve 20 and drive collar 22 will also rotate, rotating face body 34, by virtue of being keyed or locked to sleeve 20 by means of balls 40, will also rotate resulting ultimately in rotation of rotating insert 46, i.e. the rotating seal element.

Gland 11 carries a gland bushing 60 which is maintained in gland 11 by means of a snap ring 62. Gland 11 actually forms an outer, annular fixed member which, as noted, is secured to body 12 by means not shown. Gland 11 is in generally surrounding relationship to a stationary face body 66, body 66 forming an inner annular member relative to gland 11, a fixed outer annular member. Disposed between stationary face body 66 and gland 50 is a backup ring 68, sealing between gland 11 and stationary backup ring 68 being accomplished by an O-ring 70. A stationary face insert 72 is effectively carried by stationary face body 66, insert 72 forming the stationary seal element and having a face 74 which sealingly contacts face 48 of rotating insert 46.

To maintain stationary face body 66 fixed against rotation with respect to gland 11, face body 66 is keyed or locked to gland 11. To this end, face body 66 includes three circumferentially and equally spaced, hemispherical recesses 76. Gland 11 is provided with three, circumferentially and equally spaced, axially extending grooves 78, a respective one of grooves 78 being in register with a respective one of recesses 76. Received in each of recesses 76 is a ball 80, the radius of hemispherical recesses 76 being substantially the same as the radius of ball 80. Likewise, as best seen with reference to FIG. 3, the walls of the grooves 78 are radiused or curved, the radius of curvature being substantially the same as the radius of balls 80. Since the balls 80 extend into and ride on the radiused walls of the groove 78, face body 66 is effectively secured to gland 50 to prevent any relative rotation therebetween. However, because of the elongate nature of grooves 78, relative axial movement between face body 66 and gland 50 is permitted. In order to ensure sealing pressure between faces 48 and 74, a wave washer spring 82 is received in an annularly extending space between a portion of face body 66 and a portion of gland 50. It will be appreciated that wave washer spring 82 serves to urge stationary face body 66 against stationary insert 72 thereby forcing face 48 on rotating insert 46 and face 74 on stationary insert 72 into sealing contact with one another.

The use of a minimum of three such key assemblies comprised of balls 80, recesses 76 and grooves 78 in conjunction with wave spring 82 ensures maximum concentricity in the seal construction 10 thereby preventing any binding between the rotating and stationary seal elements. In addition, the use of the wave spring 82 as an energizing means as opposed to the use of coil springs minimizes problems that might arise when the seal construction 10 is used in environments where the liquid contains high solids loadings which can accumulate between the convolutions of such coil springs reducing the ability of the spring to exert uniform pressure with the possibility of the seals losing concentricity and binding. Lastly, the use of the single convolution spring member, e.g. wave washer spring 82, minimizes the size of the overall assembly.

In order to effect lubrication of the mechanical seal construction, or to provide a seal liquid, gland 11 is provided with a threaded port 90 which is in open communication with a passageway 92 which in turn is in open communication with an annular chamber 94 which generally surrounds the intersection of the rotating and stationary seal elements. Accordingly, a lubricating or seal fluid can be introduced into threaded port 90 and into contact with the seals. Gland 11 is also provided with a second threaded port 96 which is in open communication with the passageway 98 which in turn is in open communication with the annular space 81 in which is disposed wave washer spring 82 thereby permitting the annular space to be cleaned with a suitable liquid.

Figure 4:
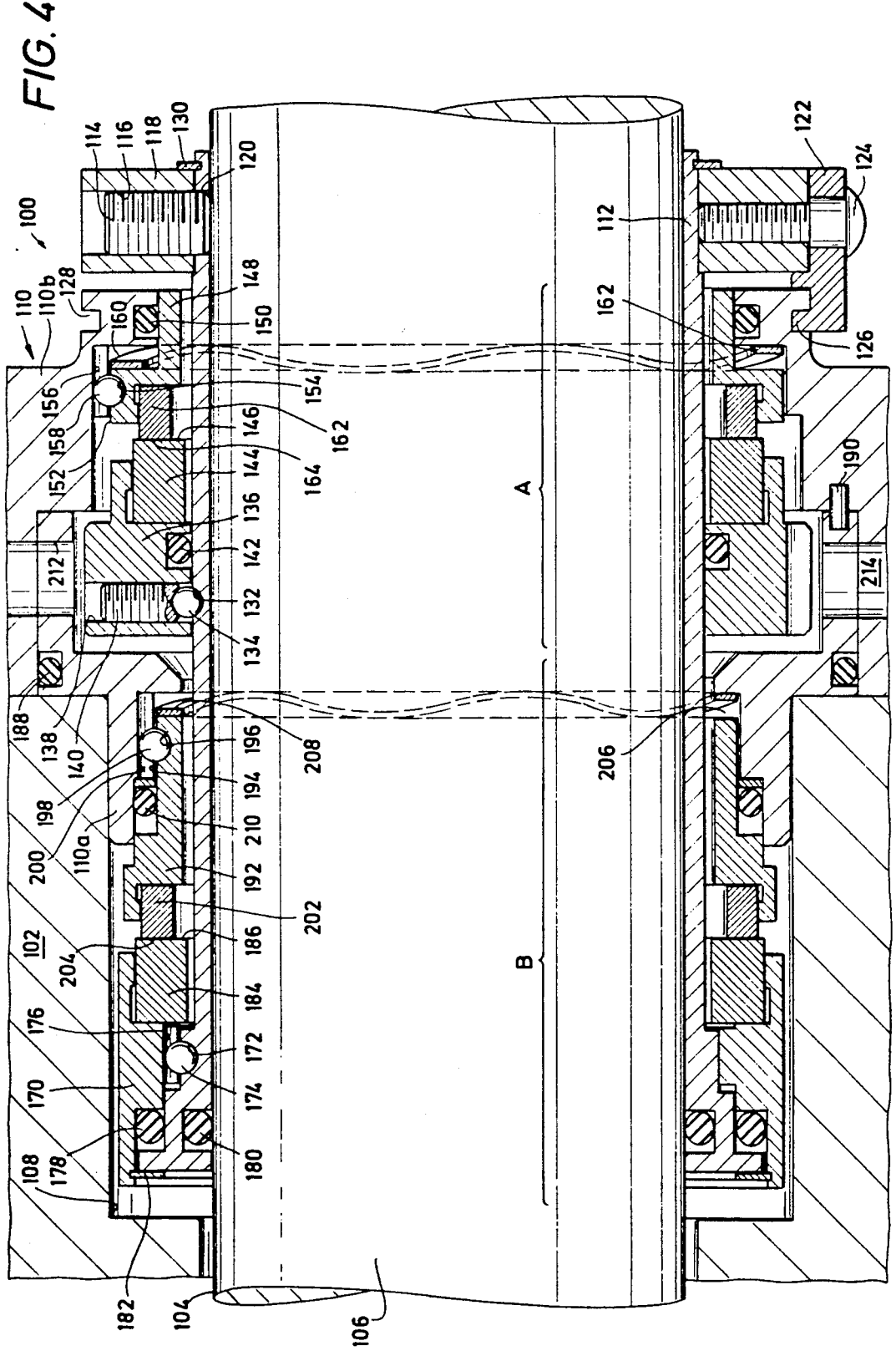
FIG. 4 is a view similar to FIG. 1 and shows a seal construction employing two seal assemblies which are in generally tandem relationship to one another.

Referring now to FIG. 4, there is shown a seal construction wherein two of the sealing assemblies substantially the same as that shown in FIG. 1 are shown in tandem arrangement. For convenience, the two seal assemblies are generally shown by the brackets designated A and B, respectively, seal assembly A being considered the outboard seal assembly, seal assembly B being considered the inboard seal assembly. The seal construction of FIG. 4, shown generally as 100, is, like seal construction 10, adapted for sealing a pump or similar piece of equipment handling gases, liquids or slurries. Pump housing 102 has an internal cylindrical wall 104 defining a bore through which a rotatable shaft 106 extends. Pump housing or body 102 also has a second internal cylindrical wall 108 which defines a bore having a larger diameter than that defined by cylindrical wall 104. Secured to the pump body or housing 102 by means not shown is a gland shown generally as 110, gland 110 being of two-piece construction having a first gland portion 110a and a second gland portion 110b. Relative rotation between portions 110a and 110b is prevented by means of one or more pins 190 received in registering bores in portions 110a and 110b. Sealing between portions 110a and 110b is accomplished by means of an O-ring 188. A sleeve 112 surrounds and is affixed to shaft 106 by means of a set screw 114 received in a threaded bore 116 of a drive collar 118 which is in encircling relationship to sleeve 112. Set screw 114 extends through a bore 120 in sleeve 112 whereby set screw 114 can be tightened against shaft 106 thereby ensuring rotation of collar 118 and sleeve 112 with shaft 106. A holding clip 122 is secured to drive collar 118 by means of a cap screw 124, holding clip 122 having a dog 126 which is received in an annular groove 128 in gland portion 110a. It will be appreciated that as shaft 106 rotates, dog 126 rotates in groove 128. A snap ring 130 keeps drive collar 118 on shaft 106.

Referring first to seal assembly A of seal construction 100, it can be seen that sleeve 112 is provided with a hemispherical recess 132 in which is received a ball member 134, ball member 134 and hemispherical recess 132 having substantially the same radius. An annular pumping ring 136 disposed in surrounding relationship to sleeve 112 has a threaded bore 138 in which is received a set screw 140. Set screw 140 engaging ball 134 thereby effectively locking pumping ring 136 to sleeve 112 and ensuring rotation of pumping ring 136 with rotation of shaft 106. Sealing between pumping ring 136 and sleeve 112 is accomplished by an O-ring 142. Pumping ring 136 carries an outboard rotating face insert 144 which forms a rotating seal element having a sealing face 146. It will be apparent that rotating insert 144 rotates with rotation of shaft 106.

Gland portion 110a, which can be considered a fixed, outer annular member, is in generally surrounding relationship to an outboard stationary face body 148 which can be considered a generally inner annular member. Sealing between outboard face body 148 and gland portion 110a is accomplished by an O-ring 150. Outboard stationary body 148 has a radially outwardly facing surface 152 in which are formed three circumferentially and generally equally spaced hemispherical recesses 154. Gland portion 110a is provided with three circumferentially and generally equally spaced axially extending grooves 156, each of a respective one of grooves 156 being in register with a respective one of the recesses 154 much in the manner as is shown in FIG. 3 vis-a-vis grooves 78 and recesses 76. Received in each of recesses 154 is a ball 158, the radius of ball 158 being substantially the same as the radius of hemispherical recess 154. Axially extending grooves 156 are radiused such as grooves 78 shown in FIG. 3, the radius of curvature being substantially the same as the radius of ball 158. It will thus be apparent that because balls 158 extend into and ride on the radiused walls of grooves 156, no relative rotation between gland 110 and outboard stationary body 148 is permitted. However, relative axial movement between those two members is permitted.

Due to the above stated fact that the ball 158 has substantially the same radius as the grooves 156 and the hemispherical recesses 154, relative movement between the gland 110 and outboard body 148, including rotational and lateral tilting movement, is clearly prescribed. As can be clearly seen in FIG. 4 and also in the single seal unit of FIGS. 2 and 3, balls 40 and 80 ride on the radiused surface of each groove 36 and 78 and remain within each hemispherical recess 38 and 78. An annular space 160 is formed between a portion of gland 10 and as portions of outboard stationary body 148. Received in annular space 160 is an annular wave washer spring 162.

Outboard stationary body 148 serves as a carrier or support for outboard stationary face insert 162 provided with sealing face 164 which engages sealing face 146 of outboard rotating insert 144. It will thus be apparent that wave spring 162 will urge outboard stationary body 148 against insert 162 which in turn will result in urging sealing face 164 against sealing face 146 of outboard rotating insert 144.

Inboard seal assembly B is quite similar to outboard seal assembly A and includes an inboard rotating face body 170. Sleeve 112 is provided with one or more hemispherical recesses 172 similar to but axially spaced from recess 132 in which is received a ball 174, the radius of ball 174 being substantially the same as the radius of hemispherical recess 172. It will be appreciated that both with respect to balls 174 and 134, as well as with respect to ball 40 shown in FIG. 1, one or more of such balls may be employed, in the preferred case, three, equally spaced balls being employed, there being a corresponding number of recesses 172. Ball 174 serves to key sleeve 112 to inboard rotating face body 170 by means of being received in an axial groove 176 formed in inboard face body 170, it being apparent that ball 174 prevents relative rotation between inboard face body 170 and sleeve 112 while at the same time ensuring rotation of inboard face body 170 with shaft 106. Relative axial movement, however, between inboard face body 170 and sleeve 112 is permitted. Inboard rotating face body 170 serves as a carrier or support for an inboard rotating insert 184, i.e. a rotating seal element, defining a sealing face 186. Sealing between inboard face body 170 and sleeve 12 is accomplished by means of an O-ring 178. O-ring 180 serving to provide a seal between sleeve 112 and shaft 106. A snap ring 182 retains sleeve 112 in inboard rotating face body 170 and in conjunction with snap ring 130 hold the entire assembly together. Portion 110a of the gland is in generally surrounding relationship to an inboard stationary face body 192, stationary face body 192 thereby forming an inner annular body relative to portion 110a which forms a fixed outer annular body. Inboard stationary body 192 has a surface 194 in which are formed three, circumferentially and equally spaced hemispherical recesses 196, recesses 196 having received therein balls 198, balls 198 having a radius substantially the same as the radii of the hemispherical recesses 196. Flange portion 110a has three axially extending, circumferentially and generally equally spaced grooves 200, a respective one of said grooves being in register with a respective one of said recesses 196. Recesses 200 have a generally curved or radiused bottom surface similar to that shown in FIG. 3 for grooves 78, the radius of the curved surface being substantially the same as the radius of the balls 198. As can be seen, balls 198 being received both in recess 196 and groove 200, effectively lock or key gland portion 110a to inboard stationary body 192. This key arrangement prevents any relative rotational movement between inboard stationary body 192 and gland portion 110a while permitting axial movement of inboard stationary body 192 relative to gland portion 110a.

Supported or carried by inboard stationary body 192 is inboard insert 202, insert 202 forming the inboard stationary seal element having a sealing face 204 which sealingly engages sealing face 186 of inboard rotating insert 184. An annular space 206 is formed between a portion of gland portion 110a and inboard stationary body 192. Disposed in annular space 206 is a wave washer spring 208, wave washer spring 208 serving to act as an energizer to urge inboard stationary body 192 toward inboard insert 202 thereby forcing sealing face 204 of inboard insert 202 and sealing surface 186 of inboard rotating insert 184 into sealing contact with one another. Sealing between inboard stationary body 192 and gland portion 110a is accomplished by an O-ring 210.

The use of the unique combination of keying the stationary seal element to a gland or other fixed portion of the seal construction by means of at least three balls received in at least three equally and circumferentially spaced complementary formed recesses in a member which carries the sealing element and in three circumferentially, equally spaced, axially extending grooves formed in the gland or other fixed element of the seal construction with the use of a wave spring or similar single convolution, annular spring member ensures concentricity in the seal assemblies, greatly reducing any chance of binding. Moreover, the use of the single convolution, annular spring elements, such as the wave spring washers, eliminates problems when the seal system is used with fluids having high solids loadings, such as paper pulp slurries, which may tend to build up between the convolutions of conventionally used coil springs.

For purposes of lubrication or cleaning the internals of the seal assembly, gland 110 is provided with ports 212 and 214 on generally diametrically opposite sides of the seal construction. As can be seen, a lubricating or cleaning liquid can be introduced into port 212 and clean both seal assemblies as well as the wave spring washers, the cleaning fluid exiting port 214. Port 212 can also be used to introduce a sealing or buffer fluid if desired to prevent any loss of the gas, liquid or slurry being handled by the pump. Additionally, the ports can be used for a fluid to cool the seal assemblies during operation.

While in the embodiments described above only three balls in registering recesses and grooves have been described as a means to key the stationary seal element to the gland or other fixed member of the seal construction, it will be appreciated that more of such key or locking assemblies can be employed if necessary. Moreover, while only a single wave spring washer has been shown as a means of energizing the stationary seal elements, it is to be appreciated that one or more of such wave spring washers, in stacked relationship, crest-to-crest or nested, can be employed. However, it is a particularly desirable feature of the present invention that the use of a single wave spring washer or other single convolution annular spring element provides sufficient energization, eliminates the need for one or more coil springs thereby reducing overall size and making the seal assemblies more adaptable for fitting into confined spaces. The wave spring can be of the washer type, i.e. a single piece stamped and formed from a suitable metal, or formed by winding a spring-like material in one or more turns. Thus, the wave springs can be formed by the edgewinding process as strip or sheet stamped process. In addition to wave spring washers, other single type convolution annular spring members which may be employed include Belleville springs. The spring members can be continuous, i.e. a ring, or can be of the split ring variety. The term "single convolution spring element" refers to a spring body which is one piece, is annular so as to completely encircle the shaft with one or more windings and in which the windings, if more than one as in an edge-wound wave spring, are substantially in axial contact with one another. Such springs are to be distinguished from compression coil springs in which the windings or convolutions, of necessity, are spaced from one another. Obviously, in order to have any spring-like features, such a single convolution spring element must have a sinuous wave or other convoluted structure, such as that possessed by a wave spring or Belleville spring, i.e. it cannot be flat, as well as be made of spring-type material.

The use of the unique assembly of at least three balls to lock or key the stationary parts together takes the stress off of the O-rings, e.g. O-ring 70 in the sense that the O-rings are used only to seal and not to effect centering of the parts in relation to one another. Moreover, the use of the three or more balls locking assembly wherein the balls remain axially positioned in the hemispherical recesses prevents the balls from being wedged between the fixed members in the event, for example, that the stationary face body becomes canted relative to the gland. In this case if the balls were received in registering axially extending grooves, one or more of the balls could become wedged as the balls would be free to move axially. In fact, in the latter case, such canting would force the balls to move.

While the seal assembly has been described with particular use with pumps, it will be appreciated that it can be used in any environment where end face mechanical seals are employed. The seal construction of the present invention can be used in single seal designs, both inside and outside, as well as multiple seal designs, including double back-to-back, double face-to-face, tandem and staged.

It is to be understood that in all cases the gland or other seal structure member and/or the pump body or housing form a fixed wall with respect to which the shaft rotates.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. In a mechanical seal construction for use between a wall and a shaft extending through the wall and rotatable relative thereto, the seal construction comprising a seal assembly including a pair of seal elements having mutually engaging sealing faces, one seal element being stationary with respect to the wall and the other seal element being rotatable in response to rotation of the shaft, the improvement comprising:

an inner, annular member operatively engaged with said stationary seal element, said inner annular member having a radially outwardly facing surface, at least three, generally equally circumferentially spaced hemispherical recesses being formed in said surface;

a fixed, outer annular member in surrounding relationship to said inner annular member, said outer annular member having at least three, generally equally circumferentially spaced, axially extending grooves, each of said grooves having a radiused surface, respective ones of said grooves being in register with respective ones of said recesses, each of said recesses having received therein a ball having a radius substantially equal to the radius of said recess and to the radius of said radiused surface of each of said grooves, each of said balls projecting into a respective one of said grooves and riding on said radiused surface and said recess to prevent relative rotation between said inner and outer annular members and thereby constraining said inner and outer annular members to closely proximate preventing relative tilting between said inner and outer annular members while permitting axial movement between said inner and outer members;

an annular space being formed between portions of said inner and outer annular members, said inner annular member being axially movable with respect to said outer annular member; and a single convolution spring member disposed in said annular space to urge said inner annular member toward said stationary seal element whereby said sealing faces on said stationary seal element and said rotating seal element are maintained in sealing contact.

2. The seal construction of claim 1 wherein said spring member comprises a wave washer spring.

3. The seal construction of claim 1 wherein said fixed, outer annular member comprises a gland.

4. The seal construction of claim 1 wherein there are three of said recesses and three of said grooves.

5. The seal construction of claim 1 including two of such seal assemblies, said seal assemblies being axially spaced along said shaft.

6. The seal construction of claim 5 wherein the rotatable seal element of one of said seal assemblies is disposed between the stationary seal elements of said two seal assemblies, the stationary seal element of one of said seal assemblies being disposed between the rotating seal elements of said two assemblies.

7. The seal construction of claim 5 wherein said fixed outer annular member comprises a gland assembly, said gland assembly having first and second portions.

8. The seal construction of claim 1, further comprising:

a second inner, annular member operatively engaged with said rotating seal element, said second inner annular member having a radially outwardly facing surface, at least three, generally equally circumferentially spaced second hemispherical recesses being formed in said surface; and a second fixed, outer annular member surrounding relationship to said second inner annular member, said second outer member having at lest three, generally equally circumferentially spaced, second axially extending grooves, respective ones of said second grooves being in register with respective ones of said second recesses, each of said second recesses having received therein a ball having a radius substantially equal to the radius of said second recess, each of said balls projecting into a respective one of said second grooves to prevent relative rotation between said second inner and said second outer annular members.

* * * * *